US009880386B2

(12) United States Patent
Clavin et al.

(10) Patent No.: US 9,880,386 B2
(45) Date of Patent: *Jan. 30, 2018

(54) AUGMENTED VIEW OF ADVERTISEMENTS

(71) Applicant: MICROSOFT TECHNOLOGY LICENSING, LLC, Redmond, WA (US)

(72) Inventors: John Clavin, Seattle, WA (US); Megan Lesley Tedesco, Sammamish, WA (US); Daniel John Wigdor, Littleton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,983

(22) Filed: Jan. 9, 2014

(65) Prior Publication Data

US 2014/0126066 A1  May 8, 2014

Related U.S. Application Data

(63) Continuation of application No. 13/041,775, filed on Mar. 7, 2011, now Pat. No. 8,670,183.

(51) Int. Cl.
*G02B 27/14* (2006.01)
*G02B 27/01* (2006.01)

(52) U.S. Cl.
CPC ...... *G02B 27/017* (2013.01); *G02B 2027/014* (2013.01)

(58) Field of Classification Search
CPC .................................................. G02B 27/017
USPC ....................................................... 359/630
See application file for complete search history.

(56) References Cited

U.S. PATENT DOCUMENTS

| 8,670,183 | B2* | 3/2014 | Clavin et al. ............... 359/630 |
| 8,898,711 | B2 | 11/2014 | Choi et al. |
| 2006/0105838 | A1* | 5/2006 | Mullen ......................... 463/31 |
| 2007/0210937 | A1 | 9/2007 | Smith et al. |
| 2011/0052083 | A1 | 3/2011 | Rekimoto |
| 2011/0213664 | A1* | 9/2011 | Osterhout et al. ......... 705/14.58 |

(Continued)

FOREIGN PATENT DOCUMENTS

| CN | 2648550 Y | 10/2004 |
| CN | 101466026 A | 6/2009 |

(Continued)

OTHER PUBLICATIONS

"First Office Action and Search Report Issued in Chinese Patent Application No. 201210056396.2" dated Mar. 30, 2015, 11 pages.

*Primary Examiner* — James Jones
(74) *Attorney, Agent, or Firm* — Shook, Hardy & Bacon L.L.P.

(57) ABSTRACT

A head-mounted display (HMD) provides an augmented view of advertisements to an HMD wearer. In some embodiments, when an advertisement is within an HMD wearer's field of view, the HMD may augment the HMD wearer's view of the advertisement to provide additional information and/or to personalize the advertisement to the HMD wearer. In other embodiments, when an advertisement is within an HMD wearer's field of view, the HMD may augment the HMD wearer's view of the advertisement to remove the advertisement from the HMD wearer's view or to replace the content of the advertisement with non-advertising content.

17 Claims, 4 Drawing Sheets

(56) References Cited

U.S. PATENT DOCUMENTS

2012/0068913 A1* 3/2012 Bar-Zeev ............ G02B 26/026
 345/8
2012/0212414 A1* 8/2012 Osterhout ............ G02B 27/017
 345/158

FOREIGN PATENT DOCUMENTS

| CN | 101578625 A | 11/2009 |
|---|---|---|
| JP | 2007199615 A | 8/2007 |

* cited by examiner

AUGMENTED VIEW OF ADVERTISEMENTS

CROSS-REFERENCE TO RELATED APPLICATIONS

This application is a continuation of U.S. patent application Ser. No. 13/041,775, filed Mar. 7, 2011, the entire disclosure of which is hereby incorporated by reference.

BACKGROUND

Advertising has become a pervasive part of our society, which may result in people sometimes feeling inundated with advertisements. Additionally, people may often feel that they have no interest in the product or service advertised. A number of factors may contribute to this. For instance, advertisements typically provide a static advertising message that is often not relevant to many people or otherwise engages them. Although some electronic billboards and other display advertisements may change the advertising message being displayed, they are still limited in what advertisements are shown. As a result, people may simply tune out the advertisements at best or actually become annoyed with the advertisements at worst, and in turn, advertisers may be less likely to see conversions from their advertisements. Further, when people actually would like advertising information regarding a product or service, they may not be able to access that information. For instance, people may see products in their everyday lives in which they are interested but may not be able to determine who sells the products or may not be able to get information regarding the products when they see them. These situations present excellent opportunities for advertising that unfortunately are lost.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to employing head-mounted displays (HMDs) to target advertising and other information to HMD wearers. In some embodiments, an advertisement in the real world may be identified within an HMD wearer's field of view. The HMD wearer's view of the advertisement may be augmented by the HMD to provide additional information and/or to personalize the advertising message to the HMD wearer. In further embodiments, the HMD wearer may be provided a service that removes or replaces advertisements in the real world from the HMD wearer's view. This may be, for instance, a fee based or other membership-based service provided to the HMD wearer. In such embodiments, when an advertisement is identified in the HMD wearer's field of view, an augmented view may be provided by the HMD to remove the advertisement from the HMD wearer's view or to replace the content of the advertisement with non-advertising content.

BRIEF DESCRIPTION OF THE DRAWINGS

The present invention is described in detail below with reference to the attached drawing figures, wherein.

DETAILED DESCRIPTION

Figure 1:
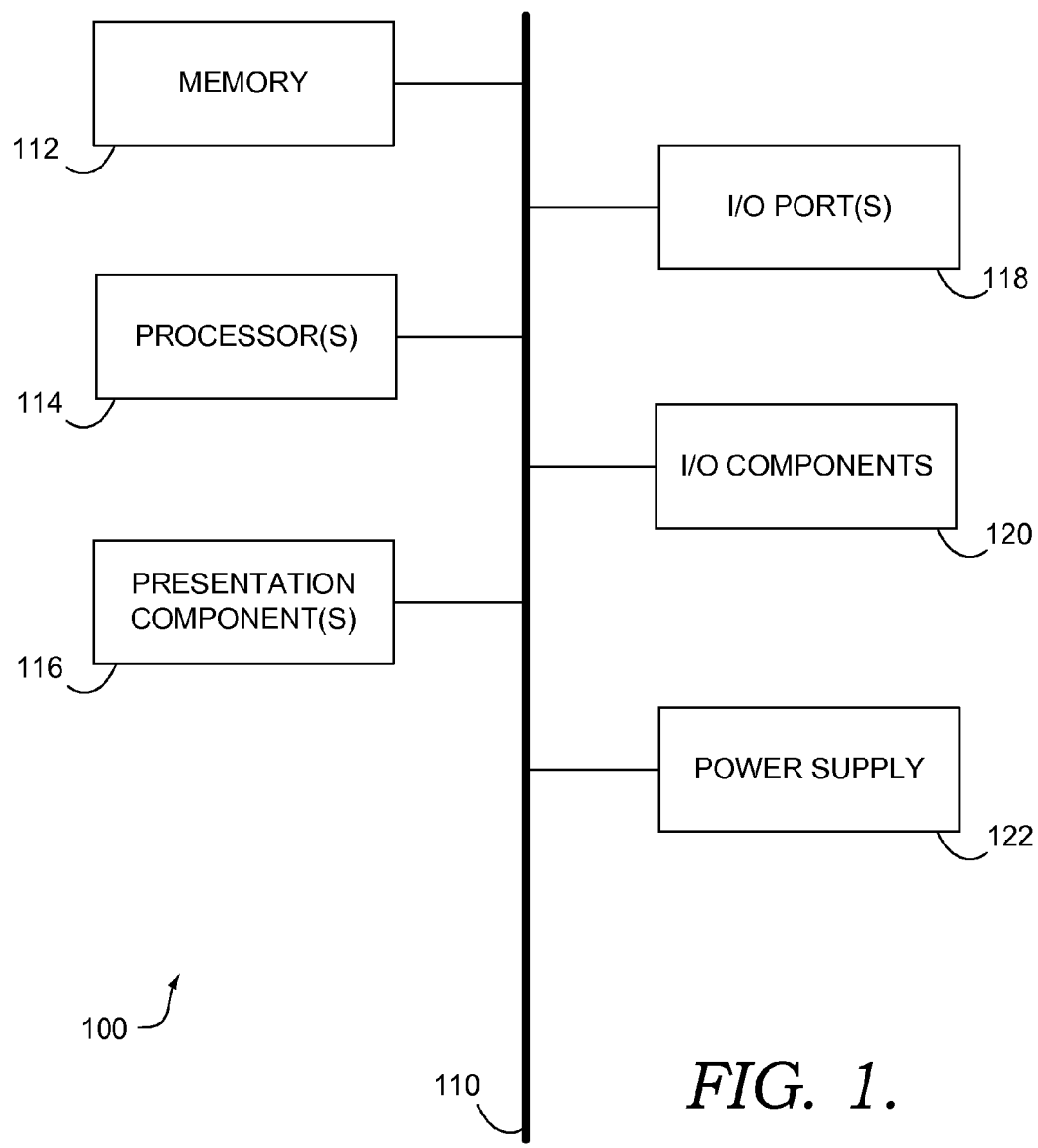
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to providing targeted advertising and other information via a head-mounted display (HMD). In accordance with some embodiments, an advertising system for an HMD may target information based on parameters indicative of the HMD wearer's current interest and other factors from the HMD wearer's current environment. The system may attempt to determine what the HMD wearer may be currently thinking about and interested in to target advertisements. The HMD wearer's gaze may be tracked to determine the HMD wearer's focus. Surrounding data may be faded out and focus placed on the HMD wearer's focal point to collect data points for advertisement selection. The HMD wearer's length of gaze may also be tracked. The longer an HMD wearer gazes at a particular subject (person, place, thing), the stronger the data point becomes. More and more information regarding the subject is brought in for advertisement selection as the HMD wearer continues to look at the subject, and more and more information is provided to the HMD wearer. In some embodiments, the HMD wearer may be looking at a particular person. The system may identify the person and bring in information about the person, which in some embodiments may be used in advertisement selection. In further embodiments, the system may use information about the focus of multiple other HMD wearers for advertisement selection. In particular, if multiple people in the HMD wearer's vicinity are looking at a particular subject, it's likely that the subject is interesting or important for some reason.

In some embodiments, an HMD wearer's view of an existing advertisement (e.g., a billboard) may be augmented by the HMD. In some instance, the advertisement may be personalized using the HMD to augment the HMD wearer's view. The advertisement may have a generic message for people who are not wearing an HMD. For people wearing an HMD, the view of the advertisement may be changed to personalize the advertisement. This may include augmenting portions of the advertisement or re-skinning the entire advertisement with a personalized message. One way an advertisement may be personalized would be placing an image of the user, the user's family, and/or the user's friends in the context of the advertisement.

In still further embodiments of the present invention, an HMD wearer may be provided the option to have advertisements removed from the HMD wearer's view or replaced with other content. In some embodiments, the advertisements may be simply removed. In other embodiments, the advertisements may be replaced with the HMD wearer's own content or other non-advertising content. For instance, an advertisement on a billboard could be replaced with a picture of the HMD wearer's family.

Accordingly, in one aspect, an embodiment of the present invention is directed to a method to remove an advertisement from an HMD wearer's view of the real world. The method includes identifying the advertisement within the HMD wearer's field of view. The method also includes causing an HMD device to display a computer-generated virtual image to remove the advertisement from the HMD wearer's view of the real world.

In another embodiment, an aspect of the invention is directed to one or more computer storage media storing computer usable instructions that, when used by one or more computing devices, cause the one or more computing devices to perform operations. The operations include identifying an advertisement within an HMD wearer's field of view of the real world. The operations also include causing an HMD device to display a computer-generated virtual image to remove the advertisement from the HMD wearer's view of the real world.

A further embodiment of the invention is directed to a system that includes one or more processors; and one or more computer storage media storing computer usable instructions that, when used by the one or more processors, cause the one or more processors to: identify an advertisement within an HMD wearer's field of view of the real world; and cause an HMD device to display a computer-generated virtual image to remove the advertisement from the HMD wearer's view of the real world.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, embodiments of the present invention may be implemented, at least in part, by an HMD. The HMD may include components such as those described above with reference to FIG. 1 for the general computing device 100, including, for instance, memory, processors, computer-readable media, input/output components, and a power supply. The HMD may be provided in any of a number of different form factors, including, for instance, glasses, goggles, or a helmet.

The HMD may generally provide an augmented view of the real world to a wearer by augmenting the wearer's view of the real world with computer-generated virtual images. To provide the wearer with an augmented view, the HMD may include display technology that displays computer-generated virtual images while still allowing the wearer to view the real world. In some embodiments, this may include heads-up display (HUD) technology, which may employ, for instance, any type of projection or microdisplay technology to provide the virtual images. Other technologies may also be employed, such as retinal displays in which images are projected directly on the wearer's retina while the wearer is viewing the real world.

In some embodiments, the HMD may align computer-generated virtual images with the HMD wearer's view of the real world as the wearer's view of the real world changes. To assist in locating virtual images in the wearer's view of the real world, the HMD may include devices that may monitor location and/or provide head, eye, and/or gaze tracking. These devices may include, without limitation, GPS or other location tracking components, cameras or other optical sensors, gyroscopes, and accelerometers, to name a few.

The HMD may also include wireless communication capabilities to allow the HMD to communicate with companion devices (e.g., smartphones), server devices, or other network components. For instance, some embodiments of the present invention may be implemented by having a cloud-based service assist the HMD in selecting virtual images to provide an augmented view of the real world. In some embodiments, the HMD may be configured to communicate directly with server devices; while in other embodiments, the HMD may communicate with server devices via a companion device local to the HMD wearer (e.g., a smartphone or other device).

Advertising Based on HMD Wearer's Focal Point

Some embodiments of the present invention are directed to providing advertisements based on the person's current interests and thoughts by tracking the person's gaze using an HMD to determine the person's focus. Instead of using data regarding objects within the HMD wearer's entire field of view, an object within the HMD wearer's actual focal point is determined and advertising information is provided based on that object. As is known in the art, a field of view includes the entire extent of what a person sees at a given moment. This is in contrast to a person's focal point, which is a small area within the field of view that is in focus. For instance, suppose an HMD wearer is located on a street with a number of restaurants and shops that are all within the HMD wearer's field of view. However, the HMD wearer may be looking at the sign of a particular shop such that the HMD wearer's focal point is on the sign. Embodiments of the present invention may determine that the HMD wearer's focal point is on the sign, obtain advertising information based on identifying the sign within the HMD wearer's focal point, and present the advertising information via the HMD.

The HMD wearer's length of gaze may also be tracked and employed for advertisement selection and display. The amount of time an HMD wearer's focal point remains on a particular object is indicative of different levels of interest in the object being viewed. The longer a person gazes at a particular object, the more interest the HMD wearer likely has in that object and the stronger the data point becomes for advertisement delivery.

In some embodiments, a minimum threshold period of time may need to be satisfied before any advertising information is provided based on a given object. For instance, an HMD wearer may pan over a particular area with the HMD wearer's focal point quickly moving from object to object. In such a situation, it may be undesirable to display advertising information for each of the objects as this may present clutter. Additionally, since the HMD wearer is not focusing on any particular object for more than a quick glance, the objects are not likely of particular interest to the HMD wearer such that advertising information based on the objects would not be particularly targeted. However, once an HMD wearer's focal point remains on a particular object for the minimum threshold of time, advertising information may be selected based on that object and presented to the HMD wearer.

Different amounts of advertising information may also be presented based on the HMD wearer's length of gaze on a given object. For instance, in some embodiments, a number of threshold periods of time may be established. As each threshold is successively reached, additional advertising information is presented to the HMD wearer. In further embodiments, instead of establishing various thresholds at which additional information is provided, more advertising information is continuously added to the HMD wearer's view as the HMD wearer's focal point remains on a given object. In some instances, an HMD wearer may glance away from an object and then return to the object. The system may be able to recognize that the HMD wearer's interest has primarily remained on the object, and the system may ignore the glance away and treat the situation as if the HMD wearer continued to view the object.

In some embodiments, a number of objects that are viewed within the HMD wearer's focal point over a period of time may be used as aggregated data for advertising selection. For instance, an HMD wearer may look at the sign of one restaurant and then view the sign of another restaurant. This information may indicate that HMD wearer is looking for a place to eat. Based on this aggregate data, the system may select advertising information regarding other restaurants in the HMD wearer's vicinity and display the information to the HMD wearer.

Additional data signals may be used for advertisement selection in conjunction with an object within an HMD wearer's focal point. By way of example only and not limitation, additional data signals that may be used may include the HMD wearer's biometrics or a user profile for the HMD wearer. For instance, in some embodiments, a user profile may be maintained for the HMD wearer and used in conjunction with an object being viewed to select advertising information to display to the HMD wearer. The user profile may include a variety of information regarding the HMD wearer, such as the HMD wearer's demographics, preferences, and interests. For instance, suppose that an HMD wearer is looking at a sign for a restaurant and the HMD wearer's user profile includes a list of restaurants that the HMD wearer prefers. Based on these data points, the system may determine that a preferred restaurant from the user profile is near the HMD wearer. As such, the system may deliver advertising information for that preferred restaurant to the HMD wearer, including the restaurant's location.

In various embodiments of the present invention, the object being viewed may be either a non-advertisement object or an advertisement. An advertisement may include anything which has the primary purpose of providing an advertising message. For instance, advertisements could include billboards, press advertisements (e.g., in magazines, newspapers, etc.), and in-store advertisements, to name a few. In contrast, a non-advertisement object could be anything else that does not have advertising as its primary purpose. For instance, the object could be something that could be purchased, such as clothing, electronic devices, etc. Additionally, the object could be a bar code or other machine-readable code. As another example, the object could be text read by the HMD wearer. Other objects, such as buildings and monuments, could also be non-advertisement objects that when viewed by an HMD wearer's focal point may trigger the display of advertising information via the user's HMD.

In instances in which the object is an advertisement, the system may retrieve and display additional information regarding the advertised message. For instance, if the advertisement is a billboard advertising a brand of shoes, the system could retrieve pricing information for the shoes at various retailers. In addition to retrieving and displaying additional information, the system could also track user interaction with the advertisement. The information could include, for instance, how long the HMD wearer looked at the advertisement, where the HMD wearer's focal point dwelled on the advertisement, and whether the HMD wearer interacted with any of the additional information provided via the HMD. This advertisement information could be collected by the HMD and communicated to any advertising system for analysis and use of the data for advertising purposes. For instance, the information could be used to analyze the effectiveness of an advertisement and the information could be provided to the advertiser.

Figure 2:
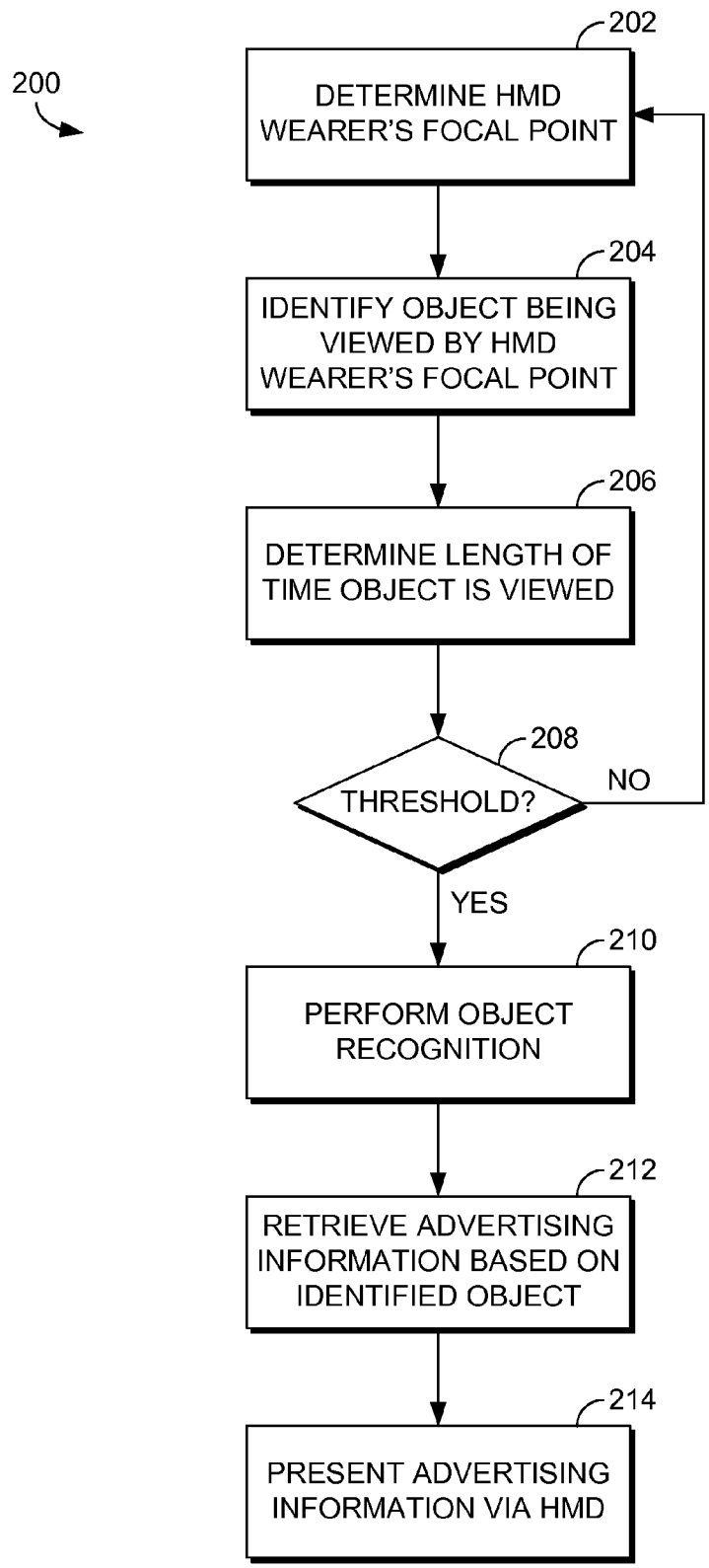
FIG. 2 is a flow diagram showing a method for providing advertisements via an HMD based on an object viewed by an HMD wearer's focal point in accordance with an embodiment of the present invention.

Turning to FIG. 2, a flow diagram is provided that illustrates a method 200 for providing advertisements via an HMD based on an object viewed by an HMD wearer's focal point in accordance with an embodiment of the present invention. Initially, as shown at block 202, the HMD wearer's focal point is determined. The HMD wearer's focal point may be determined using any of a variety of techniques for eye and gaze tracking. For instance, in one embodiment, the HMD may be equipped with outward-facing and inward-facing cameras. The outward-facing camera may be configured to capture the outside world around the HMD wearer. The inward-facing camera may be configured to track the HMD wearer's eyes to determine the line of gaze of the HMD wearer. Using images/video from these cameras, the HMD may determine where in the outside world the HMD wearer's focal point is located. As another example, in another embodiment, the HMD wearer's focal point may be determined by capturing an image on the HMD wearer's retina. It should be understood that these are only examples and other techniques for determining the HMD wearer's focal point may be employed within embodiments of the present invention.

An object being viewed by the HMD wearer's focal point is determined at block 204. Additionally, the length of time the object is viewed by the HMD wearer's focal point is determined, as shown at block 206. A determination is made at block 208 regarding whether the amount of time the object is viewed by the HMD wearer satisfies a minimum threshold. If so, object recognition is performed at block 210 to identify the object. For instance, if the HMD wearer is viewing a car of a particular make and model, the object recognition will determine that the object is a car of that make and model. It should be understood that the object recognition may be performed at block 204 when the object is initially determined. Additionally, it should be understood that any of a variety of known object recognition techniques may be used to identify the object. Further, object recognition may be performed by the HMD, a server device, or a combination. For instance, in one embodiment the HMD may transmit image data to a cloud service that performs object recognition.

After the object being viewed by the HMD wearer's focal point is identified, advertising information is retrieved based on the identified object, as shown at block 212. In some embodiments, the advertisement selection may be performed by the HMD itself if the HMD has the capabilities to locally cache advertisements. In other embodiments, the HMD may communicate with another device local to the HMD wearer (e.g., a smartphone or a dedicated ancillary device) to select advertisements. In still other embodiments, the HMD may communicate with an advertisement delivery system (e.g., a cloud-based service) either directly or via another device local to the HMD wearer to retrieve advertising information. For instance, the HMD may provide information identifying the object being viewed (or just images of the object), and the advertisement delivery system may select advertising information and provide the advertising information to the HMD. In further embodiments, the advertisement information may be selected based on other parameters, such as the HMD wearer's biometrics, user profile information for the HMD wearer, and/or past advertisements delivered to the HMD wearer. The advertising information selected may also be based on the length of time the HMD wearer views the object.

The advertising information is presented via the HMD, as shown at block 214. Typically, the advertising information may be displayed via the HMD. For instance, the HMD may include HUD technology or retinal display technology to allow the HMD wearer to view the information. In embodiments in which the HMD includes speakers, the advertising information may include audio that is played by the speakers. Any and all such combinations are contemplated to be within the scope of embodiments of the present invention.

As discussed previously, in some embodiments, if the HMD wearer continues to view a particular object, additional advertising information may be presented to the HMD wearer. Accordingly, the method 200 may continue by determining if the HMD wearer's focal point remains on the object, and if so, additional advertising information is retrieved and presented via the HMD.

It should be understood that the method 200 may be performed by an HMD alone or in combination with one or more companion devices local to the HMD wearer (e.g., a smartphone or a dedicated ancillary device) and/or network services (e.g., a cloud-based service). Any portion of the method 200 described above may be performed by any combination of these devices and services.

Although the method 200 discussed retrieving advertising information only after the HMD wearer views the object for a threshold period of time, in some embodiments, the HMD may retrieve advertising information in the background for objects in the HMD wearer's field of view or otherwise known to be in the vicinity of the HMD wearer. This may improve system latency. In particular, the advertising information is readily available and can be displayed when the HMD wearer's focal point remains on an object for the threshold period of time.

HMD Information Based on Person being Viewed

While the embodiments discussed above provide advertising information based on objects being viewed, further embodiments select and display information via an HMD based on a person being viewed by an HMD wearer. Generally, when an HMD wearer views a person, information is retrieved and presented to the user via the HMD. In some embodiments, the information may be statically displayed over to the side separate from the person being viewed, such that the information remains at the location displayed regardless of the HMD wearer movements. In other embodiments, the information may be displayed in conjunction with the person being viewed, such that the information may moves with that person. In still further embodiments, information may be audibly presented via speakers on the HMD.

The information that may be retrieved and presented based on the person being viewed may include advertising information and/or personal information regarding the person being viewed. With respect to the former, any of a variety of different advertising information may be presented based on the person being viewed. By way of example only and not limitation, advertising information regarding what clothing and accessories the person is wearing may be provided. As another example, advertising information regarding where the person had his/her hair or nails done could be provided.

In some embodiments, a person may specify information regarding products he/she owns or services the person receives to facilitate the delivery of advertising information when the person is viewed by an HMD wearer. This could be viewed as a "word of mouth" approach of spreading information regarding products and services in that an HMD wearer may find out about products or services when viewing a person. In some embodiments, advertisers may provide incentives to a person if the person includes the advertisers' products or services in the list of products and services the person would like to share with others. For instance, an advertiser could provide rebates or other incentives for a person to simply include the advertiser's product or services in the person's list of products and services that may be viewed by HMD wearers when viewing the person. In other instances, the amount of rebates or other incentives may be based on the number of HMD wearers who are presented with information regarding the advertiser's product or service when viewing the person. In some cases, the amount of rebates or other incentives may be based on the number of HMD wearers who take further action after viewing the advertising information, such as purchasing the advertiser's product or service. Any and all such variations are contemplated to be within the scope of embodiments of the present invention.

As noted above, personal information regarding a person being viewed could also be displayed via the HMD. The personal information may generally include any personal information regarding the person that may be of interest to others. In some embodiments, the information provided may be based on the context of the interaction between the HMD wearer and the person being viewed. For instance, different types of information may be appropriate for social interactions while other types of information may be appropriate for business interactions.

In some embodiments, a person is given the ability to also control access rights of HMD viewers to information associated with that person. This may include controlling which HMD wearers are able to access information for that person. Additionally, the person may be able to control what information different HMD wearers are able to access and view for that person. The access rights could be based on, for instance, individuals specifically identified by the person, individuals included in the person's contact list, and/or individuals who have some relationship with the person, such as being affiliated (e.g., "friends") in a social network.

While people may be able to control what information HMD wearers see when viewing them, HMD wearers may be able to limit what information is displayed. For instance, a large amount of information regarding a person may be available to an HMD wearer. However, the HMD wearer may only wish to see certain pieces of information. Accordingly, the HMD wearer may establish preferences regarding the type of information the HMD wearer would like to see. These preferences could be used to filter the information that is presented to the HMD wearer when viewing a person.

The HMD wearer's length of gaze on a person may also be tracked and employed for controlling the display of information. The amount of time an HMD wearer views a particular person is indicative of different levels of interest in the person being viewed. The longer a person gazes at a particular person, the more interest the HMD wearer likely has in that person.

In some embodiments, a minimum threshold period of time may need to be satisfied before any information is provided based on a given person. For instance, an HMD wearer may pan over a particular area with the HMD wearer quickly viewing one person after another. In such a situation, it may be undesirable to display information for each person as this may present clutter. Additionally, since the HMD wearer is not focusing on any particular person for more than a quick glance, the people are not likely of particular interest to the HMD wearer. However, once an HMD wearer views a particular person for the minimum threshold of time, information may be selected based on that person and presented to the HMD wearer.

Different amounts of information may also be presented based on the HMD wearer's length of gaze on a given person. For instance, in some embodiments, a number of threshold periods of time may be established. As each threshold is successively reached, additional information is presented to the HMD wearer. In further embodiments, instead of establishing various thresholds at which additional information is provided, more information is continuously added to the HMD wearer's view as the HMD wearer continues to view the person. In some instances, an HMD wearer may glance away from a person and then return to the person. The system may be able to recognize that the HMD wearer's interest has primarily remained on the person, and the system may ignore the glance away and treat the situation as if the HMD wearer continued to view the person.

Figure 3:
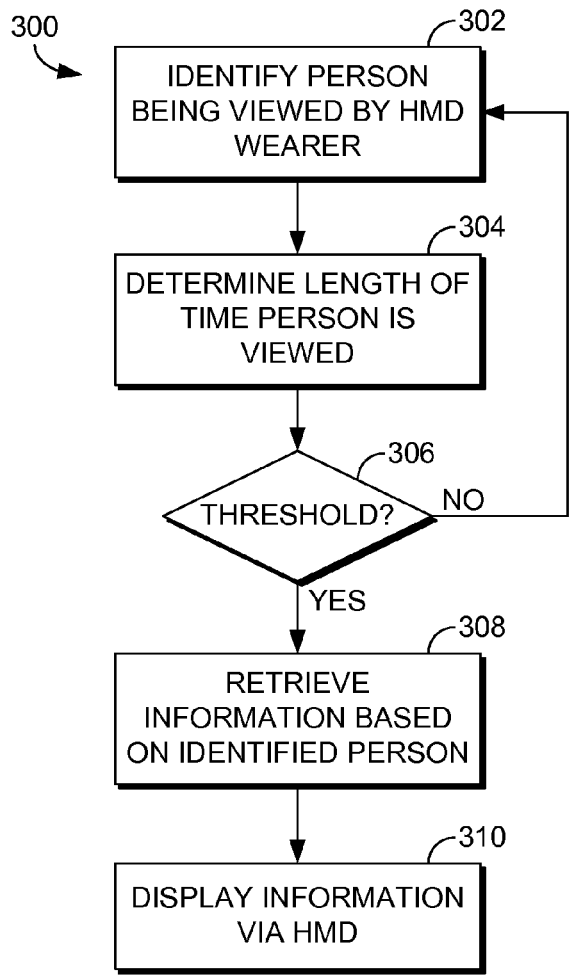
FIG. 3 is a flow diagram showing a method for employing an HMD to display information regarding a person being viewed by the HMD wearer in accordance with an embodiment of the present invention.

With reference now to FIG. 3, a flow diagram is provided that illustrates a method 300 for employing an HMD to display information regarding a person being viewed by the HMD wearer in accordance with an embodiment of the present invention. Initially, a person being viewed by the HMD wearer is identified, as shown at block 302. A person may be identified using a variety of different techniques. For instance, in some embodiments, facial recognition may be employed to identify the person being viewed. In such embodiments, the HMD may include an outward-facing camera to capture an image/video of the person. The HMD may perform the facial recognition or may communicate captured information to a server to perform the facial recognition. In other embodiments, the person being viewed may have an HMD or other device (e.g., a smartphone) that broadcasts information identifying the person. The HMD may detect the broadcasted information and use the information to detect the person.

In some embodiments of the present invention, information may only be provided for a person who is viewed by the focal point of the HMD wearer for a threshold period of time. This may reduce clutter if there are a large number of people within the HMD wearer's field of view. In such embodiments, eye and gaze tracking or other techniques such as those described above with reference to the method 200 may be employed to determine whether the HMD wearer's focal point is on a particular person. Additionally, as shown at block 304, the length of time the person is viewed by the HMD wearer is determined. At block 306, it is determined whether the length of time satisfies a minimum threshold. If so, information is retrieved based on the identified person, as shown at block 308. If the information is available locally on the HMD, the stored information may be retrieved. Additionally or alternatively, the HMD may communicate with a server to access information. Further, the HMD may communicate with a device (e.g., smartphone, HMD, etc.) of the person being viewed to obtain information. As discussed previously, the information that may be provided for a person may include advertising information and/or personal information regarding that person. Additionally, the information may be retrieved in accordance with access privileges set by the person being viewed and/or viewing preferences of the HMD wearer. Further factors, such as the context of the interaction between the HMD wearer and the person being viewed, may be considered by selecting information.

The information is presented via the HMD, as shown at block 310. The information may be displayed via the HMD, for instance, using HUD technology or retinal display technology to allow the HMD wearer to view the information. Additionally or alternatively, the information may include audio that is played by speakers on the HMD. Any and all such combinations are contemplated to be within the scope of embodiments of the present invention.

As discussed previously, in some embodiments, if the HMD wearer continues to view a particular person, additional information may be presented to the HMD wearer. Accordingly, the method 300 may continue by determining if the HMD wearer continues to view the person, and if so, additional information is retrieved and presented via the HMD.

It should be understood that the method 300 may be performed by an HMD alone or in combination with one or more companion devices (e.g., a smartphone or a dedicated ancillary device) and/or network services (e.g., a cloud-based service). Any portion of the method 300 described above may be performed by any combination of these devices and services.

Although the method 300 discussed retrieving information only after the HMD wearer views a person for a threshold period of time, in some embodiments, the HMD may retrieve information in the background for a person in the HMD wearer's field of view or otherwise known to be in the vicinity of the HMD wearer. This may improve system latency. In particular, the information is readily available to be displayed when the HMD wearer's focal point remains on a person for the threshold period of time.

HMD Information Based on What Others are Viewing

If multiple people wearing HMDs are looking at the same object or person, this may indicate that the object or person being viewed is interesting. Based on this, information could be provided to other HMD wearers in the vicinity, for instance, to bring the object or person to the other HMD wearers' attention or provide additional information regarding the object or person.

In embodiments, information may be tracked regarding objects and people viewed by HMD wearers. In some embodiments, an object or person may be considered to have been viewed by an HMD wearer if the HMD wearer's focal point remains on the object or person for a minimum threshold period of time. Additionally, a threshold of HMD wearer's viewing an object or person may be established that if satisfied for an object or person, the object or person is considered important. This threshold may be based on a total number of HMD wearers viewing the object or person or may be based on a percentage of HMD wearers in the area of the object or person who view the object or person. In some embodiments, the threshold may require the HMD wearers to view the object or person over a common time period. For instance, the HMD wearers may all be looking at a display in Times Square in New York City at the same time. In other embodiments, the threshold may allow the HMD wearers to view the object or person at different times. For instance, the system could track what visitors to an art museum view over time to identify artwork that is viewed more frequently by visitors.

The identification of objects or people that are viewed by a threshold of HMD viewers may be employed in a number of different ways in various embodiments of the present invention. In some embodiments, information may be provided to an HMD wearer in the vicinity who is not viewing the object or person to draw that HMD wearer's attention to the object or person. This may include animating the object or person to attract the HMD wearer's attention if the object or person is within the HMD wearer's field of view. This may also include providing information regarding the object or person regardless of whether the object or person is within the HMD wearer's field of view. The information may simply indicate that multiple other HMD wearer's are viewing (or viewed) the object or person or may provide more information regarding the object or person. In further embodiments, an advertisement may be selected based on an object or person viewed by a threshold of HMD wearers and delivered to HMD wearers. This may include delivering the advertisement to HMD wearers who are viewing the object or person and/or other HMD wearers in the vicinity who are not viewing the object or person.

In some instances, the object being viewed by a threshold of HMD wearers may be an advertisement. According to some embodiments, based on identifying a threshold of HMD wearers viewing an advertisement, the advertisement may be configured to perform some action. For instance, if the advertisement is an electronic billboard, the billboard's display may change in response to determining that the billboard is being viewed by a threshold of HMD wearers. In further embodiments, the HMD wearers' view of the advertisement may be augmented by the HMDs in response to determining that the billboard is being viewed by a threshold of HMD wearers.

Figure 4:
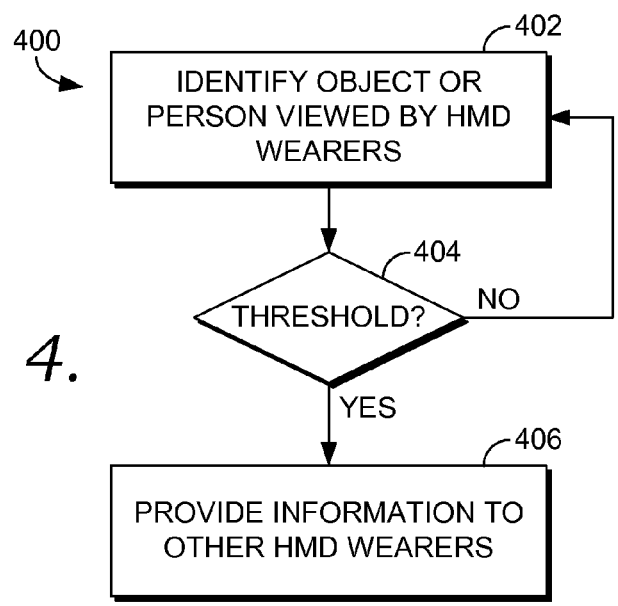
FIG. 4 is a flow diagram showing a method for providing information to an HMD wearer based on other HMD wearers viewing a particular object or person in accordance with an embodiment of the present invention.

Turning to FIG. 4, a flow diagram is provided that illustrates a method 400 for providing information to an HMD wearer based on other HMD wearers viewing a particular object or person in accordance with an embodiment of the present invention. Initially, as shown at block 402, an object or person being viewed by HMD wearers is identified. As noted above, in some embodiments, an object or person may be considered to have been viewed by an HMD wearer if the HMD wearer's focal point remains on the object or person for a threshold period of time.

A determination is made at block 404 regarding whether a threshold of HMD wearers have viewed the object or person. The threshold may be based on a total number of HMD wearers who have viewed the object or person, or a percentage of HMD wearers who have been in the vicinity of the object or person and viewed the object or person. The threshold could also be based on a comparison of the number of views by HMD wearers of other object and/or people in the vicinity such that objects and/or people viewed more frequently by HMD wearers are identified. Additionally, the threshold may require the HMD wearers to be viewing the object or person at the same time (e.g., overlapping time period) or substantially the same time (e.g., within a few seconds or minutes of one another) or the threshold may allow the HMD wearers to view the object or person at different times.

If the threshold is satisfied at block 404 for the object or person, information regarding the object or person is delivered to another HMD wearer based on the determination that the object or person has been viewed by a threshold of HMD wearers, as shown at block 406. For instance, in some embodiments, information may be provided to the HMD wearer to indicate that the object or person is interesting based on HMD wearer views. In further embodiments, advertisements could be selected based at least in part on the object or person and delivered to the HMD wearer.

Augmented View of Advertisements

Further embodiments of the present invention are directed to augmenting an HMD wearer's view of an advertisement. The advertisement may be any kind of advertisement displayed in the real world. By way of example only and not limitation, this could include billboards, press advertisements (e.g., in magazines, newspapers, etc.), in-store advertisements, and electronic advertisements, to name a few. The advertisement may have a generic message for people who are not wearing an HMD. However, for users wearing an HMD, the view of the advertisement may be augmented by the HMD to provide a richer experience.

The view of an advertisement may be augmented in any number of different manners within the scope of embodiments of the present invention. For instance, in some embodiments, an advertisement may be augmented to draw the HMD wearer's attention to the advertisement. For example, an animation may be provided around the advertisement or an image in the advertisement may become animated to attract the HMD wearer's attention. In such embodiments, the HMD may determine that the advertisement is within the HMD wearer's field of view although the HMD wearer's focal point is not on the advertisement. As such, the augmentation is added to the advertisement to draw the HMD wearer's attention. In some embodiments, after the HMD wearer's focal point is placed on the advertisement, the augmentation may be stopped or a different augmentation may be provided (e.g., a personalized view of the advertisement as discussed below).

In some embodiments, an advertisement may be augmented based on location. For instance, suppose that a billboard in Kansas City displays a general advertisement for NFL football. When the HMD wearer views the billboard, the view of the advertisement may be augmented by showing information and/or other images for the Kansas City Chiefs football team.

In further embodiments, the view of an advertisement being viewed by an HMD wearer may be augmented to personalize the advertisement for the HMD wearer. For instance, a user profile of information may be maintained that may be employed to provide personalized, augmented views of advertisements. The user profile information may include any of a variety of information regarding the HMD wearer, such as demographic information, preferences, and interests. For instance, suppose that the HMD wearer is viewing a billboard that has a general message about NFL football. Suppose further that the user profile indicates that the HMD wearer is a fan of the Philadelphia Eagles football team. When the HMD wearer views the advertisement, the view of the advertisement may be augmented such that it displays information and/or other images regarding the Eagles team.

An advertisement may also be personalized by augmenting the view of the advertisement with personalized images. For instance, an advertisement could be personalized by placing an image of the HMD wearer, the HMD wearer's family, and/or the HMD wearer's friends in the context of the advertisement. By way of example, suppose that a billboard advertises an amusement park and shows an image of people riding in a roller coaster. When an HMD wearer views the billboard, an augmented view could be provided in which images of the HMD wearer and members of the HMD wearer's family are shown riding in the roller coaster.

Augmenting an HMD wearer's view of an advertisement may include augmenting portions of the advertisement or re-skinning the entire advertisement in various embodiments of the present invention. Additionally, the augmented view may include, for instance, any combination of 2-dimensional images, 3-dimensional images, static images, or dynamic images.

Figure 5:
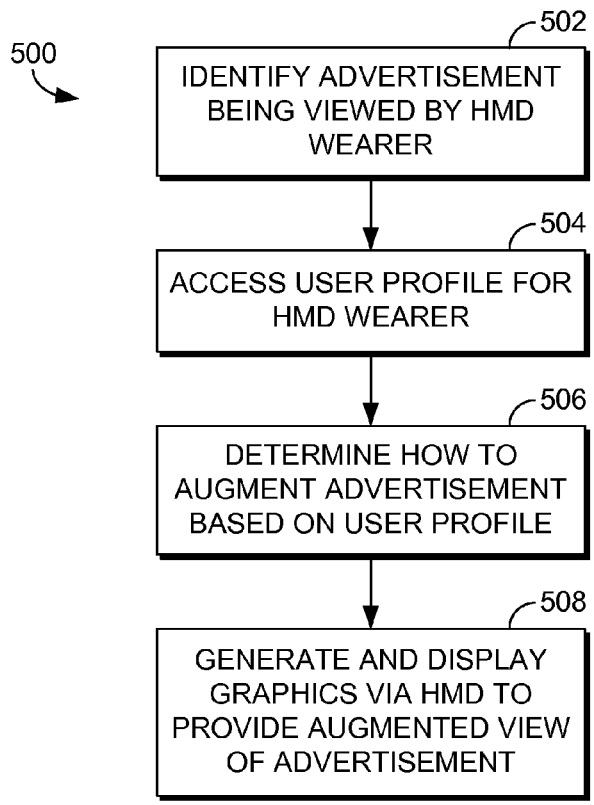
FIG. 5 is a flow diagram showing a method for employing an HMD to augment an HMD wearer's view of an advertisement to personalize the advertisement in accordance with an embodiment of the present invention.

Turning to FIG. 5, a flow diagram is provided that illustrates a method 500 for employing an HMD to augment an HMD wearer's view of an advertisement to personalize the advertisement in accordance with an embodiment of the present invention. Initially, as shown at block 502, an advertisement being viewed by the HMD wearer is identified. For instance, the HMD may include an outward-facing camera that captures images/video of the real world around the HMD wearer. Object recognition may be employed to identify the advertisement from images/video captured by the HMD. In some embodiments, the advertisement will only be identified if the HMD wearer's focal point remains on the advertisement for a minimum period of time. In other embodiments, any advertisement in the HMD wearer's field of view or otherwise in the vicinity of the HMD wearer may be identified. For instance, GPS or other location information may be used to determine that a particular advertisement is located near the HMD wearer.

A user profile for the HMD wearer is accessed at block 504. The user profile may include a variety of information for the HMD wearer, including, for instance, demographic information, preferences, and interests. Based on the advertisement identified at block 502 and the user profile information accessed at block 504, a determination is made regarding how to augment the HMD wearer's view of the advertisement, as shown at block 506. As discussed previously, any augmentation that personalizes the generic advertisement for the HMD wearer may be employed. Graphics to augment the advertisement are generated and displayed by the HMD, as shown at block 508. Accordingly, the HMD wearer is provided a personalized augmented view of the advertisement.

It should be understood that the method 500 may be performed entirely by the HMD or in conjunction with one or more companion devices (e.g., a smartphone or a dedicated ancillary device) and/or one or more server devices (e.g., via a cloud-based service). For instance, the user profile could be maintained either locally on the HMD, companion device, or may be stored by a server device. Additionally, the determination of how to augment the advertisement and/or the generation of graphics could be performed by the HMD itself, companion device, or by a server device (which could transmit graphics information to the HMD or otherwise instruct the HMD how to augment the view of the advertisement).

Removing or Replacing Advertisements

Given the amount of advertising in today's world, some people may feel inundated with advertisements. To address this issue, in some embodiments, an HMD may augment the view of an advertisement to either remove the advertisement or replace the advertisement with other non-advertising content. As such, while other embodiments discussed above are directed to augmenting an HMD wearer's view of an advertisement to enhance the advertising message, the currently discussed embodiments are directed to removing the advertising message altogether from the HMD wearer's view.

As noted above, in some embodiments, advertisements may be removed from the HMD wearer's view. For instance, the HMD may augment the view of a billboard to make the billboard appear to be blank. However, the HMD viewer would still see the blank billboard. Alternatively, the HMD may augment the view of the billboard by making it appear that the billboard isn't there at all. The HMD (or a server device in communication with the HMD) may determine what computer-generated virtual images should be generated and displayed to present to the HMD wearer what is behind the advertisement to make it appear that the advertisement isn't there. By way of specific example, if the advertisement is a billboard on the side of a building, the virtual image may represent the side of the building to make the building appear without the billboard.

Alternatively, instead of removing an advertisement, the advertising content on the advertisement may be replaced with non-advertising content. In some instances, the non-advertising content may be the HMD wearer's own content. For instance, the content on a billboard could be replaced with an image from the HMD wearer's photo library. As such, instead of seeing billboards and other advertisements as the HMD wearer moves around the real world, the HMD wearer would see their own images where the advertisements are displayed. In other instances, the non-advertising content may be content not owned by the HMD wearer. For instance, a billboard could be replaced with images from places the HMD wearer has never been. When an advertisement is replaced with other content, the content shown may be static content, such as an image, or the content shown may be dynamic content, such as a video. For example, if the HMD wearer is a football fan, an advertisement could be replaced with video from a football game. Additionally, the replacement content may be 2-dimensional or 3-dimensional content.

The HMD wearer may be provided with the ability to control which advertisements are removed or replaced with other content. In some embodiments, the HMD wearer may have preferences specifying which advertisements to remove or replace based on the content of the advertisements. For instance, the user preferences may specify that advertisements directed to clothing are to be removed or replaced, while advertisements directed to sporting events may be displayed. In some embodiments, the HMD wearer may have preferences for the type of advertisement to remove or replace. For instance, the user preferences may specify that billboards are removed or replaced, while other types of advertisements (e.g., press advertisements) are to be displayed. Additionally, the preferences may specify whether the various advertisements are removed or replaced with other content. In the case of replacing advertisements with non-advertising content, the preferences may specify the non-advertising content to use when replacing advertisements. Any and all such combinations of the above are contemplated to be within the scope of embodiments of the present invention.

The ability to remove or replace advertisements with other content may be a fee-based service provided to users or may be an option provided to users who are members of some service or group. For instance, the ability to remove or replace advertisements may be provided as an option to users who are Xbox Live members. Additionally, various levels of control may be given to users based on the fee paid or the membership level of the user (e.g., Xbox Live Silver members or Xbox Live Gold members). This may include, for instance, the ability to remove advertisements, the ability to replace advertisements with other content, the ability to control what content is used to replace advertisements, and the ability to control content or types of advertisements removed or replaced. Generally, a higher fee or membership level will provide greater control to the user.

Figure 6:
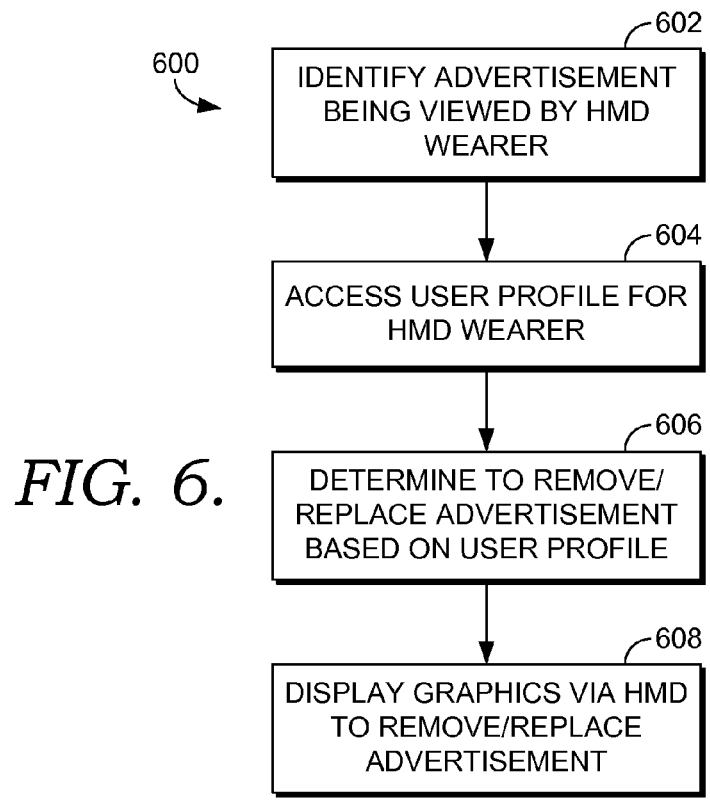
FIG. 6 is a flow diagram showing a method for employing an HMD to augment an HMD wearer's view of an advertisement to remove or replace the advertisement in accordance with an embodiment of the present invention.

Turning to FIG. 6, a flow diagram is provided that illustrates a method 600 for employing an HMD to augment an HMD wearer's view of an advertisement to remove or replace the advertisement in accordance with an embodiment of the present invention. Initially, as shown at block 602, an advertisement being viewed by the HMD wearer is identified. For instance, the HMD may include an outward-facing camera that captures images/video of the world around the HMD wearer. Object recognition may be employed to identify the advertisement from images/video captured by the HMD. In some embodiments, the advertisement will only be identified if the HMD wearer's focal point remains on the advertisement for a minimum period of time. In other embodiments, any advertisement in the HMD wearer's field of view or otherwise in the vicinity of the HMD wearer may be identified. For instance, GPS or other location information may be used to determine that a particular advertisement is located near the HMD wearer.

A user profile for the HMD wearer is accessed at block 604. The user profile may include preferences regarding the removal and/or replacement of advertisements. Based on the advertisement identified at block 602 and the user profile information accessed at block 604, a determination is made regarding whether to remove the advertisement from the HMD wearer's view or to replace the HMD wearer's view of the advertisement with other content, as shown at block 606. Graphics to remove the advertisement or replace the advertising content are generated and displayed by the HMD, as shown at block 608. Accordingly, the advertisement is either removed from the HMD wearer's view or the advertising content is replaced with other content.

The method 600 may be performed entirely by the HMD or in conjunction with one or more companion devices (e.g., a smartphone or a dedicated ancillary device) and/or one or more server devices (e.g., via a cloud-based service). For instance, the user profile could be maintained either locally on the HMD, companion device, or may be stored by a server device. Additionally, the determination of whether to remove or replace the advertisement and/or the generation of graphics could be performed by the HMD itself, companion device, or by a server device (which could transmit the graphics information to the HMD).

Although various embodiments have been described separately herein, it should be understood that combinations of these may be employed. For instance, in some embodiments, an advertisement that is being viewed by multiple HMD wearers may be brought to the attention of an HMD wearer who is not directly viewing the advertisement by augmenting the HMD wearer's view to animate the advertisement. Once the HMD wearer views the advertisement (e.g., the HMD wearer's focal point is on the advertisement), the view of the advertisement may be personalized to the HMD wearer. As another example, the HMD wearer's user profile may cause some advertisements to be removed from the HMD wearer's view while other advertisements are augmented to personalize the advertisements to the HMD wearer. Any and all such combinations are contemplated to be within the scope of embodiments of the present invention.

As can be understood, embodiments of the present invention provide a number of approaches for targeting advertising and other information to HMD wearers. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A head-mounted display (HMD) device comprising:
   one or more cameras;
   a display; and
   a processor configured to perform operations to:
   identify a real-world advertisement within images captured by the one or more cameras; and
   generate a computer-generated virtual image and present the computer-generated virtual image via the display to remove the entire real-world advertisement from an augmented view of the real world provided by the display.

2. The HMD device of claim 1, wherein the computer-generated virtual image is displayed to remove the real-world advertisement from the augmented view of the real world when a focal point of a wearer of the HMD device is on the real-world advertisement.

3. The HMD device of claim 1, wherein the computer-generated virtual image is displayed to remove the real-world advertisement from the augmented view of the real world based on user preferences to remove real-world advertisements containing particular advertising content and a determination that the real-world advertisement contains the particular advertising content.

4. The HMD device of claim 1, wherein the computer-generated virtual image is displayed to remove the real-world advertisement from the augmented view of the real world based on user preferences to remove a particular type of real-world advertisement and a determination that the real-world advertisement is of the particular type of real-world advertisement.

5. One or more tangible computer storage hardware devices storing computer usable instructions that, when used by one or more computing devices, cause the one or more computing devices to perform operations comprising:
   identifying a real-world advertisement currently within a person's field of view of the real world based on images captured by one or more cameras on an HMD device worn by the person; and
   in response to identifying the real-world advertisement, causing the HMD device to display a computer-generated virtual image to remove the entire real-world advertisement from an augmented view of the real world provided to the person by the HMD device.

6. The one or more tangible computer storage hardware devices of claim 5, wherein the computer-generated virtual image is displayed to remove the real-world advertisement from the augmented view of the real world provided by the HMD device when the HMD device determines the person's focal point is on the real-world advertisement.

7. The one or more tangible computer storage hardware devices of claim 5, wherein the computer-generated virtual image is displayed to remove the real-world advertisement from the augmented view of the real world provided by the HMD device based on user preferences to remove real-world advertisements containing particular advertising content and a determination that the real-world advertisement contains the particular advertising content.

8. The one or more tangible computer storage hardware devices of claim 5, wherein the computer-generated virtual image is displayed to remove the real-world advertisement from the augmented view of the real world provided by the HMD device based on user preferences to remove a particular type of real-world advertisement and a determination that the real-world advertisement is of the particular type of real-world advertisement.

9. The one or more tangible computer storage hardware devices of claim 5, wherein the computer generated virtual image is displayed to remove the real-world advertisement from the augmented view of the real world provided by the HMD device based on a fee-based or membership-based service.

10. The one or more tangible computer storage hardware devices of claim 5, wherein a server device in communication with the HMD device determines how to display the computer-generated virtual image to remove the real-world advertisement from the augmented view of the real world provided by the HMD device.

11. The one or more tangible computer storage hardware devices of claim 5, wherein a companion device local to the person and in communication with the HMD device determines how to display the computer-generated virtual image to remove the real-world advertisement from the augmented view of the real world provided by the HMD device.

12. A system comprising:
    one or more processors; and one or more computer storage media storing computer usable instructions that, when used by the one or more processors, cause the one or more processors to:
- identify a real-world advertisement currently within a person's field of view of the real world based on images captured by one or more cameras on an HMD device worn by the person; and
- cause the HMD device to display a computer-generated virtual image to remove the entire real-world advertisement from an augmented view of the real world provided to the person by the HMD device.

13. The system of claim 12, wherein the computer-generated virtual image is displayed to remove the real-world advertisement from the augmented view of the real world provided by the HMD device when the HMD device determines the person's focal point is on the real-world advertisement.

14. The system of claim 12, wherein the computer-generated virtual image is displayed to remove the real-world advertisement from the augmented view of the real world provided by the HMD device based on user preferences to remove real-world advertisements containing particular advertising content and a determination that the real-world advertisement contains the particular advertising content.

15. The system of claim 12, wherein the computer-generated virtual image is displayed to remove the real-world advertisement from the augmented view of the real world provided by the HMD device based on user preferences to remove a particular type of real-world advertisement and a determination that the real-world advertisement is of the particular type of real-world advertisement.

16. The system of claim 12, wherein the computer generated virtual image is displayed to remove the real-world advertisement from the augmented view of the real world provided by the HMD device based on a fee-based or membership-based service.

17. The system of claim 12, wherein a server device in communication with the HMD device or a companion device local to the person and in communication with the HMD device determines how to display the computer-generated virtual image to remove the real-world advertisement from the augmented view of the real world provided by the HMD device.

* * * * *